F. S. BARNARD.
JOINT FOR UNITING WOOD, &c.

No. 23,542. Patented Apr. 12, 1859.

Frederick S. Barnard

Witnesses.
Lemuel W. Serrell
Thomas G. Harold

UNITED STATES PATENT OFFICE.

FREDERICK S. BARNARD, OF NEW YORK, N. Y.

DOVETAIL JOINT FOR WOOD, &c.

Specification of Letters Patent No. 23,542, dated April 12, 1859.

*To all whom it may concern:*

Be it known that I, FREDERICK S. BARNARD, of the city, county, and State of New York, have invented, made, and applied to use a certain new and useful Improvement in Joints for Wood and other Materials, which I term the "Tongued and Grooved Sectional Dovetail;" and I do hereby declare that the following is a full, clear, and exact description of the construction and operation of the same, reference being had to the annexed drawing, making part of this specification, wherein—

Figure 1:
Figure 2:
Figure 3:
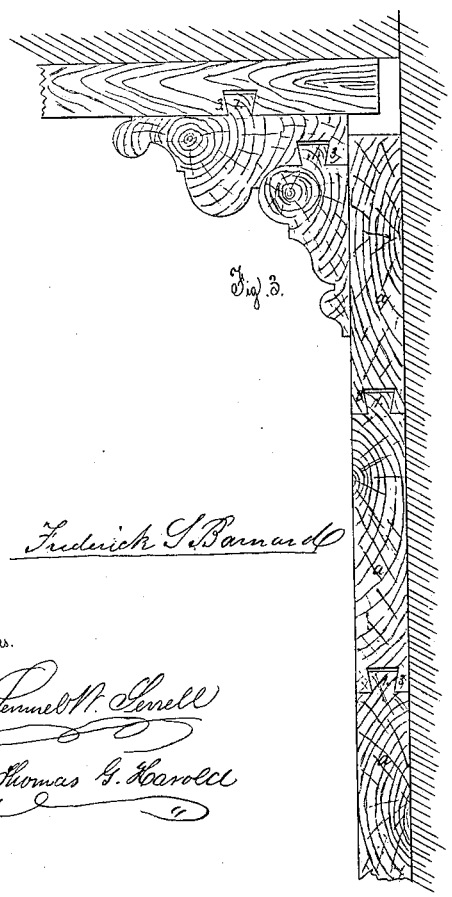

Figure 1, is an edge view of a piece of plank with my tongued sectional dovetail; Fig. 2, is a similar view showing the groove, and Fig. 3, is a section of a molding in the angle between panels, or wainscoting work.

Similar marks of reference indicate the same parts.

In attaching the edges of planks it has heretofore been usual to tongue and groove the same and glue the parts together or else to use dovetail tongues and grooves slipped in from the end, the whole length, the difficulty in doing which is such that dovetail tongues and grooves can be used for only short lengths of stuff.

The nature of my said invention consists in tongued and grooved sectional dovetail so constructed that the tongue can be entered into the groove for any length of material and then the dovetail of tongue is slipped into the dovetail of the groove by an endwise movement, which draws the joint tightly together in a manner that is permanent durable, easily applied without the use of glue or cement and will insure a perfectly tight or close joint. I am thus enabled to make strong durable and beautifully finished work without the use of nails brads or any foreign substance, and the parts can be easily slipped apart and removed, and that regardless of their length, whereas the ordinary dovetail tongue and groove would have to be driven or slid together or apart its whole length; and with my joint both surfaces can be highly finished.

In the drawing *a*, *a*, represent planks or slabs of any desired width thickness or material.

1, is the tongue formed of a dovetail shape, from the edges of which sections are removed as at 2, 2, so that the tongue at this point is only the thickness of the base of the dovetail.

Figure 4:

3, is a groove in the outer edge of the material formed of a dovetail shape from end to end except at the sections 4, 4, where the inward projecting sides of the groove are removed so that these parts are as wide as the bottom of the groove. The dovetails of the tongue are to be entered into the groove at the sectional parts 4, 4, between the dovetail parts of the groove; and when down in place, an endwise motion is given, so that the dovetails slide into each other, and the joint is perfect, as shown in Fig. 4.

In Fig. 3, I have represented two pieces of molding united together by a joint of the foregoing character, also a wainscoting coming up behind the molding, which molding in this instance is represented as attached to the paneling of the ceiling by a similar joint. It will be apparent that a paneled or wainscoted room can be formed with woodwork united by the foregoing joints, and the panels can be allowed to expand or contract according to the weather, behind the moldings or cornices; in this instance the panels, if the joints are vertical, should be attached about the middle of the top and bottom edges, but if the joints be horizontally the panel may rest at its lower edge on the floor or on the baseboard. In cases where the panels, or other articles fitted with my joint as aforesaid are subject to contraction or expansion the joint at the edge of the panel may be rendered tight by the insertion of a strip of caoutchouc or its equivalent, acting against the surface of said panel, or a strip of wood or other material kept out by a spring may be used.

I do not limit myself to the material in which my aforesaid tongued and grooved sectional dovetail is formed, but intend to apply the same wherever available.

Having thus described the nature of my invention and shown some of the ways in which the same may be applied I remark that other instances of its utility will suggest themselves to the carpenter builder cabinet maker or others such as in the construction of columns pilasters, table tops and a great many other articles whenever available.

The tongued and grooved sectional dovetails can be formed by means of saws and beveled gages, or by mechanism especially adapted to the purpose for which I propose hereafter to seek Letters Patent.

What I claim as my invention and desire to secure by Letters Patent is—

The tongued and grooved sectional dovetail joint to connect wood or other material together in substantially the manner specified.

In witness whereof I have hereunto set my signature this fifth day of March 1859.

FREDERICK S. BARNARD.

Witnesses:
LEMUEL W. SERRELL,
THOMAS G. HAROLD.